United States Patent [19]

Jansen et al.

[11] Patent Number: 5,647,962

[45] Date of Patent: Jul. 15, 1997

[54] PROCESS FOR THE PREPARATION OF XEROGELS

[75] Inventors: Rolf-Michael Jansen, Kelkheim; Andreas Zimmermann, Griesheim, both of Germany

[73] Assignee: Hoechst Aktiengesellschaft, Frankfurt, Germany

[21] Appl. No.: 495,931

[22] Filed: Jun. 28, 1995

[30] Foreign Application Priority Data

Jun. 30, 1994 [DE] Germany ............... 44 22 912.7

[51] Int. Cl.⁶ ............... B01D 3/34; C01B 33/12
[52] U.S. Cl. ............... 203/57; 423/338; 502/233
[58] Field of Search ............... 203/12, 29, 34, 203/38, 39, 57; 423/335, 338; 502/233

[56] References Cited

U.S. PATENT DOCUMENTS

| | | |
|---|---|---|
| 3,801,705 | 4/1974 | Krekeler et al. . |
| 3,846,537 | 11/1974 | Marotta ............... 423/338 |
| 4,042,770 | 8/1977 | Bachl et al. ............... 526/106 |
| 4,190,457 | 2/1980 | McDaniel ............... 423/338 |
| 4,382,070 | 5/1983 | Novak et al. ............... 423/338 |
| 4,649,037 | 3/1987 | Marsh et al. ............... 423/338 |
| 4,975,405 | 12/1990 | Okamura et al. ............... 423/338 |
| 5,122,291 | 6/1992 | Wolff et al. ............... 252/62 |
| 5,275,796 | 1/1994 | Tillotson et al. ............... 423/338 |

FOREIGN PATENT DOCUMENTS

| | | |
|---|---|---|
| 0396076 | 11/1990 | European Pat. Off. . |
| 682574 | 11/1952 | United Kingdom . |
| WO92/03378 | 3/1992 | WIPO . |

OTHER PUBLICATIONS

Chemisches Zentralblatt, No. 20, 1965, Berlin, pp. 87–90 by F. Polak et al.
Chemical Abstracts, vol. 81, No. 14, Oct. 7, 1974, Columbus, Ohio, Abstract No. 82740a by J. Viska et al.

Primary Examiner—Christopher Kim
Attorney, Agent, or Firm—Curtis, Morris & Safford, P.C.

[57] ABSTRACT

The invention relates to modified $SiO_2$ gels (xerogels), the preparation thereof and the use thereof as thermal insulators. The xerogels are prepared by acidifying an aqueous waterglass solution, polycondensing the silicic acid produced thereby, by adding a base, to an $SiO_2$ gel, removing the water from the resulting gel by extractive distillation with an organic solvent which forms with water an azeotrope which separates on cooling into two phases, reacting the gel with a silylating agent, and then drying at pressures and temperatures which are below the critical pressure and/or the critical temperature of the organic solvent used for removing the water.

10 Claims, No Drawings

PROCESS FOR THE PREPARATION OF XEROGELS

The invention relates to a process for the preparation of modified $SiO_2$ gels, called "xerogels" hereinafter, and to the xerogels prepared in this way themselves and to the use thereof.

Aerogels in the wider sense, i.e. in the sense of "gel with air as dispersion medium", are prepared by drying a suitable gel. The term "aerogel" in this sense includes the aerogels in the narrower sense, xerogels and cryogels. In this connection, a dried gel is designated an aerogel in the narrower sense when the liquid of the gel is removed very substantially at temperatures above the critical temperature and starting from pressures above the critical pressure. On the other hand, if the liquid of the gel is removed under subcritical conditions, for example with formation of a liquid/vapor boundary phase, the resulting gel is then designated a xerogel.

The prepared xerogels are related to the customary $SiO_2$ aerogels but are not identical to them.

$SiO_2$ aerogels are known to have an excellent insulating action. They are prepared, for example, by acid hydrolysis of tetraethyl orthosilicate in ethanol. The hydrolysis results in a gel whose structure is determined by the temperature, the pH and the duration of the gelling process. However, in general, the gel structure collapses on drying the wet gels because the capillary forces arising during the drying are extremely large. The collapse of the gel can be prevented by carrying out the drying above the critical temperature and the critical pressure of the solvent. Since the liquid/gas phase boundary disappears in this region, the capillary forces also do not apply, and the gel does not change during the drying, i.e. there is no shrinkage of the gel during the drying either. Preparation processes based on this drying technique, are disclosed, for example, in EP-A-0 396 076 or WO 92 03378. However, this technique requires, for example when ethanol is used, a temperature above 240° C. and pressures above 40 bar. Although replacement of ethanol by $CO_2$ before the drying lowers the drying temperature to about 40° C., the pressure required is then 80 bar.

It has now been found that $SiO_2$ gels can be dried under subcritical conditions when they are reacted before the drying with a silylating agent. The resulting products are designated "xerogels" hereinafter. They are excellent thermal insulators.

The invention relates to a process for the preparation of xerogels, which comprises a) adjusting an aqueous waterglass solution to a pH <3.0, preferably <2.2, using an acid ion exchange resin or a mineral acid, b) polycondensing the silicic acid produced thereby, by adding a base, to an $SiO_2$ gel and, if a mineral acid was used in step a), washing the gel with water until free of electrolytes where appropriate, c) removing the water from the gel obtained in step b) by extractive distillation with an organic solvent which forms with water an azeotrope which separates into two phases on cooling, until the water content of the gel is <5% by weight, d) reacting the gel obtained in step c) with a silylating agent, e) drying the silylated gel obtained in step d) at pressures and temperatures which are below the critical pressure and/or the critical temperature of the organic solvent used in step c).

An acid ion exchange resin is preferably employed in step a); particularly suitable for this purpose are those which contain sulfonic acid groups. If mineral acids are employed, hydrochloric acid and sulfuric acid are particularly suitable. In general, sodium and/or potassium waterglass is used as waterglass. The concentration of the waterglass is thereby preferably in the range from 1 to 20% by weight and most preferably in the range from 5 to 12% by weight.

The base preferably employed in step b) is $NH_4OH$, NaOH, KOH, $Al(OH)_3$ and/or colloidal silicic acid. If a mineral acid was used in step a), the $SiO_2$ gel produced using the base is washed where appropriate with water until free of electrolytes; washing is preferably continued until the draining wash water has the same electrical conductivity as demineralized water.

Before step c), the gel is preferably allowed to age, in general at 0° to 150° C., preferably at 80° to 130° C., and at a pH of 4 to 11, preferably 4 to 9. The time for this is generally from 10 seconds to 48 hours, preferably from 10 seconds to 5 hours.

In step c), the water contained in the gel is removed by extractive distillation with an organic solvent until the water content of the gel does not exceed 5% by weight and is preferably ≦2% by weight. The solvent employed must form with water an azeotrope which separates into two liquid phases on cooling, an aqueous phase an a solvent phase. Examples of suitable solvents are toluene, di-n-butyl ether or methyl isobutyl ketone. Toluene is preferably used.

The solvent phase resulting on cooling of the azeotrope can be returned to the process.

Steps a) to c) are generally carried out at a temperature between the freezing point of the solution and the boiling point of the solvent.

In step d), the solvent-containing gel is reacted with a silylating agent. The silylating agents employed are generally silanes of the formulae $R^1_{4-n}SiCl_n$ or $R^1_{4-n}Si(OR^2)_n$ with n=1 to 3, where $R^1$ and $R^2$ are, independently of one another, $C_1$–$C_6$-alkyl, cyclohexyl or phenyl. Silazanes are also suitable. Mono, di- or trimethylchlorosilane, trimethyl-methoxysilane or hexamethyl-disilazane is preferably used. The reaction is generally carried out at 20° to 100° C., preferably 30° to 70° C., if necessary in a solvent such as toluene, acetone, n-hexane, n-heptane, di-n-butyl ether, i-propanol or methyl isobutyl ketone. The silylation can also be carried out, where appropriate, under pressure, preferably up to 25 bar. Where appropriate, the silylated gel can also be washed before drying.

In step e), the silylated gel is dried at temperatures from −30 to the boiling point of the solvent, preferably from −30° to 200° C., particularly preferably from 0° to 150° C. The pressures used for the drying are preferably from 0.001 to 20 bar, particularly preferably from 0.01 to 5 bar. The drying is generally continued until the gel has a remaining solvent content of less than 0. 1% by weight.

To obtain special thermal properties it may be advantageous for the xerogel additionally to contain IR opacifiers (such as, for example, carbon black, titanium dioxide, iron oxides and zirconium dioxide). These IR opacifiers are preferably added before step b) in such cases.

The process according to the invention is to be illustrated by an example.

EXAMPLE 1 l of a sodium waterglass solution (with a content of 6% by weight $SiO_2$ and an $Na_2O:SiO_2$ ratio of 2:3) was passed through a column (diameter 50 mm, length 300 mm) which was packed with 0.5 l of an acid ion exchange resin (styrene/divinylbenzene copolymer with sulfonic acid groups, commercially available under the name ®Duolite C20). The solution flowing out had a pH of 1.5. The solution was then adjusted to a pH of 5.6 with 1 molar $NH_4OH$ solution. The resulting gel was then aged at 50° C. for 24 hours and subsequently the water was extracted using 3 l of toluene in an extraction vessel with water separator at about 100° C. The extraction was stopped when the calculated amount of water (about 920 ml) had separated out. The toluene-containing gel was then silylated with trimethylchlorosilane (TMCS) at 50° C. for 12 hours (0.05 g of TMCS per gram of toluene-containing gel). The gel was dried in a drier flushed with $N_2$ under atmospheric pressure (6 hours at 40° C. then 2 hours at 50° C. and 12 hours at 150° C.).

The transparent xerogel obtained in this way had a density of 0.12 g/cm$^3$. The BET specific surface area was 920 m$^2$/g. The $\lambda$ value was 0.016 W/mK.

The thermal conductivity was measured by a hot wire method (see, for example, O. Nielsson, G. Rüschenpöhler, J. Groβ, J. Fricke, High-Temperatures-High-Pressures, Vol. 21, 267–274 (1989)).

We claim:

1. A process for the preparation of xerogels, which comprises
   a) adjusting an aqueous waterglass solution to a pH ≦3.0, using an acid ion exchange resin or a mineral acid,
   b) polycondensing the silicic acid produced thereby, by adding a base, to an $SiO_2$ gel
   c) removing the water from the gel obtained in step b) by extractive distillation with an organic solvent which forms with water an azeotrope which separates into two phases on cooling, until the water content of the gel is ≦5% by weight,
   d) reacting the gel obtained in step c) with a silylating agent,
   e) drying the silylated gel obtained in step d) at pressures and temperatures which are below the critical pressure and/or the critical temperature of the organic solvent used in step c).

2. The process as claimed in claim 1, wherein an acid ion exchange resin is employed in step a).

3. The process as claimed in claim 1, wherein the base in step b) is selected from the group consisting of $NH_4OH$, NaOH, KOH, $Al(OH)_3$ and colloidal silicic acid.

4. The process as claimed in claim 1, wherein the $SiO_2$ gel obtained in step b) is allowed to age at 0° to 150° C. and at a pH of 4 to 11 for a period of from 10 seconds to 48 hours before the water is removed in step c).

5. The process as claimed in claim 1, wherein the organic solvent in step c) is selected from the group consisting of toluene, di-n-butyl ether and methyl isobutyl ketone.

6. The process as claimed in claim 1, wherein the silylating agent in step d) is selected from the group consisting of mono-, di- or trimethylchlorosilane, trimethylmethoxysilane and hexamethyldisilazane.

7. The process as claimed in claim 1, wherein the silylated gel is dried at −30° to 200° C. in step e).

8. The process as claimed in claim 1, wherein the silylated gel is dried under 0.001 to 20 bar in step e).

9. A process for the preparation of xerogels, which comprises
   a) adjusting an aqueous waterglass solution to a pH ≦3.0, using a mineral acid, b) polycondensing the silicic acid produced thereby, by adding a base, to an $SiO_2$ gel,
   c) removing the water from the gel obtained in step b) by extractive distillation with an organic solvent which forms with water an azeotrope which separates into two phases on cooling, until the water content of the gel is ≦5% by weight,
   d) reacting the gel obtained in step c) with a silylating agent,
   e) drying the silylated gel obtained in step d) at pressures and temperatures which are below the critical pressure and/or the critical temperature of the organic solvent used in step c).

10. A process for the preparation of xerogels, which comprises
    a) adjusting an aqueous waterglass solution to a pH ≦3.0, using a mineral acid,
    b) polycondensing the silicic acid produced thereby, by adding a base, to an $SiO_2$ gel and washing the gel with water until free of electrolytes,
    c) removing the water from the gel obtained in step b) by extractive distillation with an organic solvent which forms with water an azeotrope which separates into two phases on cooling, until the water content of the gel is ≦5% by weight,
    d) reacting the gel obtained in step c) with a silylating agent,
    e) drying the silylated gel obtained in step d) at pressures and temperatures which are below the critical pressure and/or the critical temperature of the organic solvent used in step c).

* * * * *